G. C. NELSON.
FRICTION CLUTCH.
APPLICATION FILED NOV. 14, 1919.
1,427,623.
Patented Aug. 29, 1922.
3 SHEETS—SHEET 2.
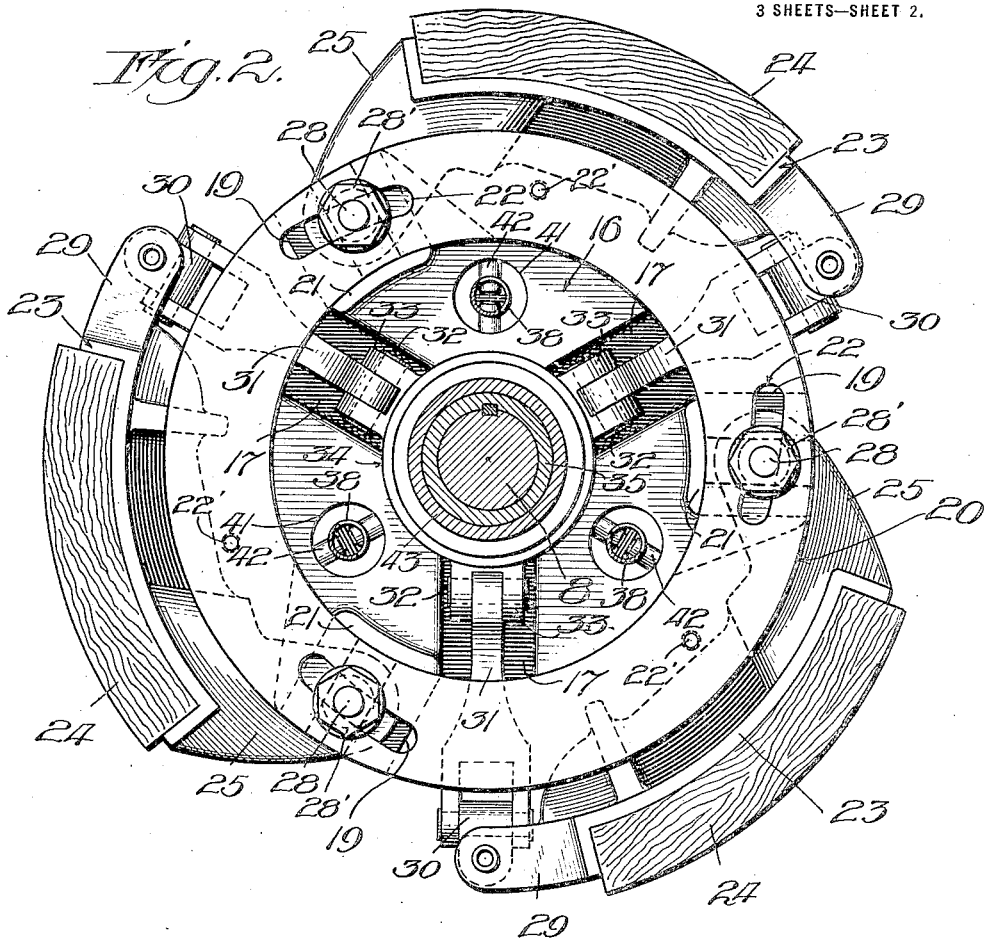
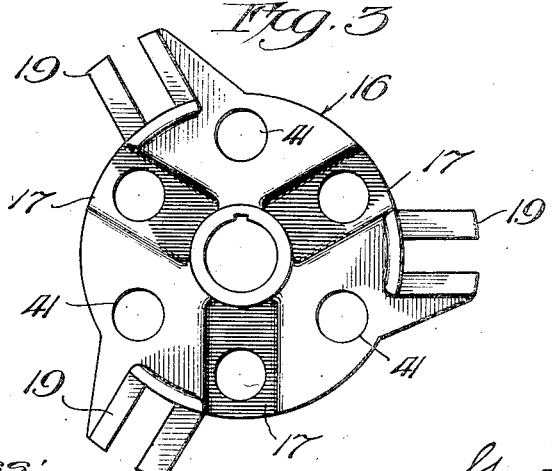
Witness:
Harry S. Gaither
Inventor:
Gustav C. Nelson
by Wm J. Bell, Atty

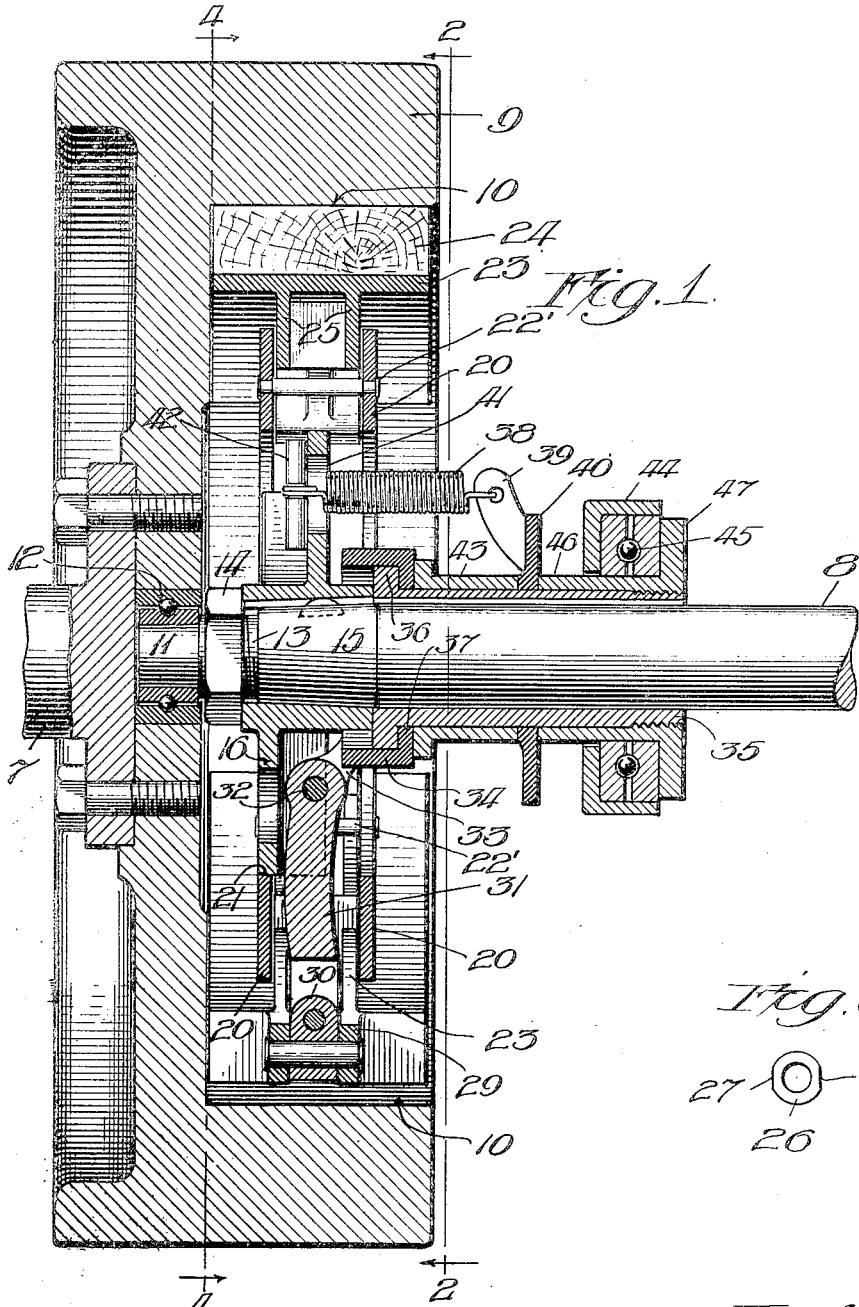

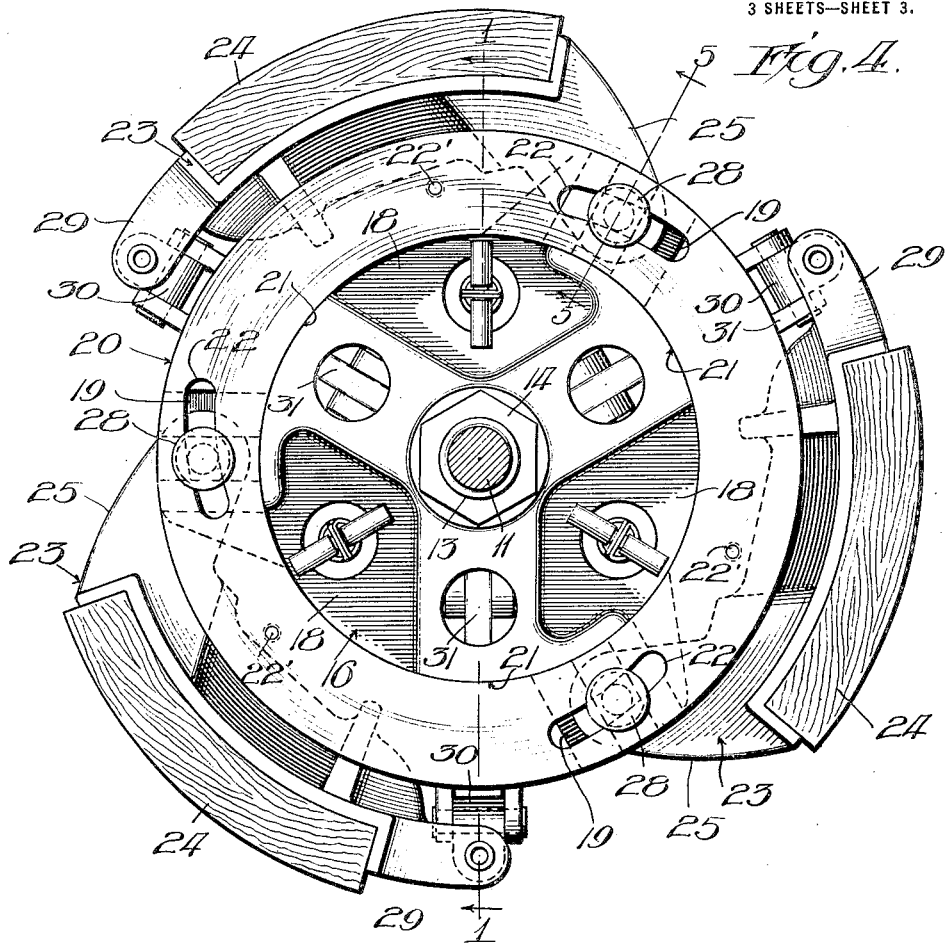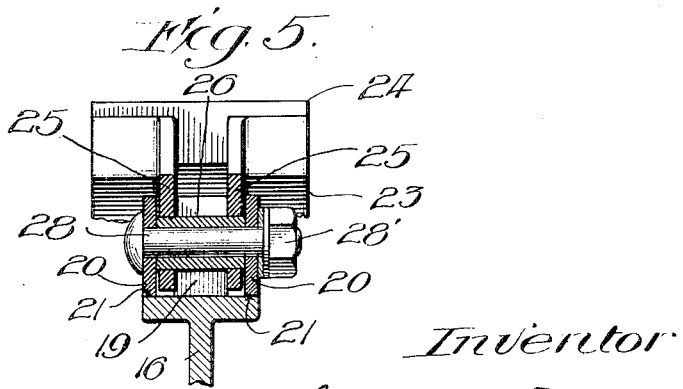

UNITED STATES PATENT OFFICE.

GUSTAVE C. NELSON, OF MOLINE, ILLINOIS, ASSIGNOR TO THE BORG & BECK COMPANY, OF MOLINE, ILLINOIS, A CORPORATION OF ILLINOIS.

FRICTION CLUTCH.

1,427,623.  Specification of Letters Patent.  Patented Aug. 29, 1922.

Application filed November 14, 1919. Serial No. 337,940.

*To all whom it may concern:*

Be it known that I, GUSTAVE C. NELSON, a citizen of the United States, residing at Moline, in the county of Rock Island and State of Illinois, have invented certain new and useful Improvements in Friction Clutches, of which the following is a specification.

This invention relates to dry friction clutches and it is designed primarily but not exclusively for use with gas engines in automobiles, trucks, and tractors where positive action combined with flexibility of action is most highly desirable.

The object of the invention is, generally, to provide a strong and substantial clutch of light and simple construction and comparatively few parts which can be manufactured at low cost and which will operate with uniformity and with a minimum of wear.

The invention also has for its objects to provide a clutch in which all the parts constitute a single unit and act as such when the clutch is thrown in or when it is released; to avoid end thrust on the crank shaft and lost motion on the transmission shaft; to eliminate jumping, jerking and other irregular actions and to provide a substantial but sensitively operating clutch which can be let in quickly or gradually as the driver may desire; to avoid spinning of the transmission parts when the clutch is thrown out, so that gear change can be made without dragging or grinding; to prevent the parts from rattling and provide a noiselessly operating clutch; and to provide simple and easily operated adjusting means to take up the wear on the friction shoes.

My invention may be embodied in a fly-wheel provided with a chamber to accommodate the clutch, or in a fly-wheel having a separate casing mounted thereon and containing the clutch, in a manner familiar in the art, and it can be made in different ways and in various sizes to accommodate different conditions.

In the accompanying drawings I have illustrated a selected form of the invention in which a fly-wheel is provided with a clutch chamber and the clutch is positioned therein, and referring to the drawings Fig. 1 is a central sectional view on the line —1—1 of Fig. 4.

Fig. 2 is a sectional view on the line 2—2 of Fig. 1.

Fig. 3 is a detail plan view of the main plate.

Fig. 4 is a sectional view on the line 4—4 of Fig. 1.

Fig. 5 is a sectional view on the line 5—5 of Fig. 4.

Fig. 6 is a detail view of a bushing.

Referring to the drawings 7 is a driving shaft and 8 is a driven shaft which may be the crank shaft and the transmission shaft, respectively, of a motor driven vehicle. A fly-wheel 9 is rigidly mounted on the crank shaft and is provided with a chamber 10 to receive the clutch. The end 11 of the driven shaft 8 is reduced in size and is supported in a pilot bearing 12 mounted centrally within the fly-wheel. Adjoining the reduced end of the driven shaft there is a threaded portion 13 which receives a nut 14, and this threaded portion adjoins a conical portion 15 which is of greater diameter than the threaded portion.

A main plate 16 (Fig. 3) is keyed or otherwise rigidly secured to the conical portion 15 of the driven shaft and is held in place thereon by the nut 14 which positions it and the parts carried thereby properly within the clutch chamber of the fly-wheel (Fig. 1). This main plate has a plurality of spaced radial depressions 17 on one side (Figs. 2—3) and alternating depressions 18 on the other side (Fig. 4) to accommodate other parts of the clutch in a compact and convenient manner as will be noted by referring to Fig. 1. The main plate is provided with a plurality of slotted radial projections 19 which constitute driving arms as will hereafter appear.

An adjusting member is mounted on the main plate and comprises two rings 20 which abut against shoulders 21 on the main plate and are secured together by pins 22' or other suitable means. These rings 20 are provided with registering eccentric slots 22 located at spaced intervals. The construction is such that the adjustment member moves bodily in any adjusting thereof, and this movement must be in a circular orbit on the shoulders 21 of the main plate as guides.

A plurality of shoe heads 23 carrying friction shoes 24 are pivotally mounted at one end in the slotted driving arms and in the eccentric slots of the adjusting member. Each of these heads is provided at one end with ears 25 (Fig. 5) in which a bushing 26 is mounted to engage the slotted driving arm 19. The bushing is flattened at 27 where it engages the driving arm so that it can not turn in said arm. The bushing extends somewhat beyond the ears 25 to engage the adjusting rings 20 and space them apart so that they may be adjusted freely without engaging said ears. A bolt 28 extends through the registering eccentric slots 22 of the adjusting member and the bushing and is provided with a nut 28'. Thus the bushing forms the pivot for the shoe head in the slotted driving arm of the main plate and at the same time forms a spacer for maintaining the adjusting rings in proper spaced relation, and the bolt secures the adjusting rings, the bushing and the shoe together in proper relation.

The other end of the shoe head is also provided with ears 29 which are pivotally connected by a universal joint 30 with one end of a toggle lever 31 which is preferably curved slightly as shown in Fig. 1. The other end of this lever is pivotally connected by a pin 32 between the ears 33 which project outwardly from a toggle collar 34. A throw out sleeve 35 is splined to the transmission shaft 8 to turn therewith and slide longitudinally thereon. This sleeve has a peripheral flange 36 at one end to engage the peripheral flange 37 on the toggle collar 34 and move the toggle collar outward away from the main plate (to the right in Fig. 1) to release the clutch. The pivotal connection at 32 between the inner end of each toggle lever and the toggle collar causes the toggle levers to swing laterally in respect of the clutch as a whole, and longitudinally of the driven shaft, when the toggle collar is moved longitudinally of the driven shaft; and the universal joint at 30 connecting the outer end of each toggle lever with one end of the shoe head permits this lateral or transverse swinging movement of the toggle levers and also a swinging movement of the shoe heads radially of the clutch which is imparted thereto by the movement of the toggle levers and expands or contracts the clutch. Since the other fulcrum end of each shoe head is pivotally engaged with the main plate in a fixed (adjusted) position the shoe heads will be moved by the levers radially of the clutch as a whole because the pivot 28 of the fulcrum end of each head is nearer to the center of the clutch than the universal joint connection 30 at what may be called the actuating end of the shoe head. And while the head does swing on the fulcrum pivot 28 the shoe 24 actually moves bodily in a radial direction from or towards the center of the clutch to the extent that is necessary for effective frictional engagement of the shoe with the fly-wheel. This movement of the shoe is comparatively slight but sufficient to lock the clutch and the fly-wheel in rigid frictional engagement to impart movement from the driving shaft to the driven shaft, or to release the clutch from the fly-wheel to stop the movement of the driven shaft. And this engagement of the shoe with the fly-wheel extends throughout the face of the shoe, thus insuring ample frictional contact for effective work.

The friction shoes are held normally in operative engagement with the fly-wheel by springs 38 which are connected at one end to arms 39 on a flange 40 which travels with the throw out sleeve 35, and at their other end to the main plate. In the drawings the ends of the springs project through openings 41 in the main plate and are engaged with pins 42 which span the openings. A throw in sleeve 43 is arranged on the throw out sleeve 35 between the toggle collar 37 and the spring flange 40. The springs 38 being anchored at one end to the main plate, which is rigid on the driven shaft 8, pull the spring flange 40 against throw in sleeve 43 and the latter against toggle collar 34 to hold said collar normally in its inward position, (to the left in Fig. 1) with the shoes projected into effective frictional engagement with the fly wheel. A non-rotating throw out yoke 44 provided with a thrust ball bearing 45 is arranged on a sleeve 46 which is mounted on the throw out sleeve 35 between the spring flange 40 and the end flange 47 on the sleeve 46 (Fig. 1). Any suitable throw out yoke and ball bearing may be used with my improved clutch.

My present invention provides a dry friction clutch of very few parts and of simple construction which is easily adapted for different installations. It can be arranged in the clutch chamber of a fly-wheel, as illustrated in Fig. 1, or it may be self-contained and enclosed within a separate casing adapted to be mounted on a fly-wheel in a manner well understood in the art. In Fig. 1 I have shown the clutch thrown in as it normally stands in a motor driven vehicle, the friction shoes being thrust outwardly against the fly-wheel under the influence of springs 38 with sufficient pressure to make rigid frictional locking engagement with the fly-wheel so that motion from driving shaft 7 will be communicated without slippage to the driven shaft 8. In this position all the parts of the clutch will turn with the fly-wheel and the driven shaft as a single unit.

The clutch is always under the control of the driver through the foot lever (not shown) and the latter may be operated to let the clutch into engagement by degrees, thus gradually increasing the friction grip of the shoes on the fly-wheel without injury to the clutch or unnecessary wear on the shoes so that the speed of revolution of the driven shaft may be increased as gradually as desired. In other words the clutch may be operated to take hold quickly for full driving action, or gradually to eliminate everything in the nature of a starting jerk, without injury or damage to the clutch. This is especially desirable in city driving as it enables the speed of the motor driven vehicle to be advanced from stationary to city speed within a very short distance. The friction shoes are preferably made of wood and my experience is that such shoes will last about as long as may be required under ordinary conditions of use. The shoes can be adjusted easily and without taking down the clutch by simply loosening the nuts 28' and adjusting the rings 20 rotatively. This adjustment of the rings will move the shoe head pivots 28 in or out, as the case may be, by reason of the eccentric disposition of the slots 22, and thereby as fine an adjustment as may be desired can easily be obtained. The shoes are fitted and supported in the shoe heads in any desirable manner and if the necessity should arise they can be renewed as often as required.

When the foot lever is applied the throw out sleeve 35 and toggle collar 34 are moved sufficiently on the driven shaft to actuate the toggle levers and withdraw the shoes from their frictional engagement with the fly wheel. In this position all the parts of the clutch will be freed from the fly-wheel as a complete unit and the driven shaft will come at once to a complete stop while the fly-wheel and the driving shaft are left free to revolve idly. When pressure on the foot lever is released the springs acting on flange 40 pull throw in sleeve 43, inward (to the left in Fig. 1), and this sleeve moves the toggle collar inward and swings the toggle levers to force the friction shoes into operative engagement with the fly wheel.

The clutch is light in weight and consequently it develops no appreciable momentum when released, and lost motion and spinning or other irregular action of the driven shaft is avoided. The construction of the clutch is such that wear of parts is reduced to a minimum and excessive strains are avoided so that a light construction may be employed without danger of breakage or excessive wear. Consequently a clutch of this kind installed in an automobile will continue in first class operative condition, with such adjustments as may be required, throughout the normal life of the car under ordinary conditions of use. And the clutch is so mounted on the driven shaft and operates by peripheral engagement with the fly-wheel that end thrust on the driving shaft is entirely avoided.

I have selected for the purpose of this application a clutch which in actual test I have found very satisfactory but I am aware that for different installations and for other reasons and purposes it may be desirable to vary the construction and arrangement of parts to a more or less extent from that shown and described, and I, therefore, wish to have it understood that I reserve the right to make all such changes as fairly fall within the scope of the accompanying claims.

I claim:

1. The combination of a driving element provided with a clutch chamber, and a driven element, of clutch mechanism mounted on the driven element within said chamber and comprising a support rigidly mounted on the driven element, a plurality of shoe heads each pivoted at one end to the support, means for simultaneously adjusting the pivoted ends of all of said heads, friction shoes in said heads, a toggle collar movable longitudinally of the driven element, and toggle levers pivoted to the collar and connected to the other ends of the shoe heads to move the shoes radially of the driven element into or out of operative engagement with the driving element.

2. The combination of a driving element provided with a clutch chamber, and a driven element, of clutch mechanism mounted on the driven element within said chamber and comprising a support, a plurality of shoe heads each pivotally mounted at one end on the support and extending peripherally thereof, friction shoes carried by said shoe heads, means for simultaneously adjusting all of said shoe heads, a toggle collar movable longitudinally of the driven element, and toggle levers pivoted to said collar and extending therefrom radially of the support and connected to the free ends of said shoe heads to move the shoes radially of the driven element into or out of operative engagement with the driving element.

3. The combination of a driving element provided with a clutch chamber, and a driven element, of clutch mechanism mounted on the driven element within said chamber and comprising a support having radially disposed depressions therein, a plurality of friction devices peripherally disposed about the support, a toggle collar movable longitudinally of the driven element, and toggle levers pivotally connected to the collar and to the friction devices and operating in said depressions to move the friction devices radially of the driven element into or out of operative engagement with the driving element.

4. The combination of a driving element provided with a clutch chamber, and a driven element, of clutch mechanism within said chamber and comprising a support mounted on said driven element, a plurality of friction devices peripherally disposed about the support, a toggle collar movable longitudinally of the driven element, a spring flange for moving said collar in one direction, springs connected to said flange and anchored to the support, and toggle levers pivoted to the collar and the friction devices to move the friction devices radially of the driven element into or out of operative engagement with the driving element.

5. The combination of a driving element provided with a clutch chamber, and a driven element, of clutch mechanism within said chamber and comprising a support mounted on said driven element, a plurality of friction devices peripherally disposed about the support, pivot devices engaging said support and friction devices, means for moving said friction devices radially of the support into or out of operative engagement with the driving element, and means for simultaneously adjusting all of said pivot devices radially of the support.

6. The combination of a driving element provided with a clutch chamber, and a driven element, of clutch mechanism within said chamber and comprising a support mounted on said driven element, a plurality of friction devices peripherally disposed about the support, pivot devices engaging said support and one end of each friction device, means engaged with the other end of each friction device for moving said friction devices radially of the support into or out of operative engagement with the driving element, and means for simultaneously adjusting all of said pivot devices radially of the support comprising an adjusting member rotatable relative to the support and having eccentrically disposed slots to receive said pivot devices.

7. The combination of a driving element provided with a clutch chamber, and a driven element, of clutch mechanism within said chamber and comprising a support mounted on said driven element, a plurality of friction devices peripherally disposed about the support, pivot devices engaging said support and friction devices, means for moving said friction devices radially of the support into or out of operative engagement with the driving element, and means for adjusting said pivot devices radially of the support comprising a pair of spaced rings rotatable relative to the support and having oppositely disposed eccentric slots to receive said pivot devices.

8. The combination of a driving element provided with a clutch chamber, and a driven element, of clutch mechanism within said chamber and comprising a support mounted on said driven element, a plurality of friction devices peripherally disposed about the support, pivot devices engaging said support and friction devices, means for moving said friction devices radially of the support into or out of operative engagement with the driving element, and means for adjusting said pivot devices radially of the support comprising a pair of spaced rings secured together and rotatably mounted on the support and having oppositely disposed eccentric slots to receive said pivot devices.

9. The combination of a driving element provided with a clutch chamber, and a driven element, of clutch mechanism mounted on the driven element within said chamber and comprising a support having driving arms, a plurality of friction devices peripherally disposed about the support, adjusting rings embracing said driving arms and having oppositely disposed eccentric slots, bushings engaging said driving arms and friction devices to pivotally mount the friction devices on the support, and bolts passing through the adjusting rings and bushings to secure said parts together.

10. The combination of a driving element provided with a clutch chamber, and a driven element, of clutch mechanism mounted on the driven element within said chamber and comprising a support having driving arms, a plurality of friction devices peripherally disposed about the support, adjusting rings embracing said driving arms and having oppositely disposed eccentric slots, bushings engaging said driving arms and friction devices to pivotally mount the friction devices on the support, and bolts passing through the adjusting rings and bushings to secure said parts together, said bushings engaging the rings to space them apart.

11. The combination of a driving element provided with a clutch chamber, and a driven element, of clutch mechanism mounted on the driven element within said chamber and comprising a support having radially projecting driving arms, arranged in pairs, a plurality of friction devices peripherally disposed about the support and each having ears thereon, to embrace a pair of said driving arms, a pivot device engaged with the ears of each friction device and seated between a pair of driving arms on the support to pivotally engage the friction devices with the support, and means for moving the friction devices into and out of operative engagement with the driving element.

12. The combination of a driving element provided with a clutch chamber, and a driven element, of clutch mechanism mounted on the driven element within said chamber and comprising a support having radially projecting driving arms, a plurality of friction devices peripherally disposed about the support and each having ears thereon, a bushing engaged with the ears of each friction device and with a pair of driving arms on the support, adjusting rings cooperatively engaged and spaced apart by the bushing, and a bolt passing through said rings and the bushing to secure the parts together.

13. The combination of a driving element provided with a clutch chamber, and a driven element, of clutch mechanism mounted on the driven element within said chamber and comprising a support having driving arms arranged in pairs radially projecting therefrom, a plurality of friction devices peripherally disposed about the support and each having ears thereon, a bushing engaged with the ears of each friction device and seated between a pair of said driving arms, and means for maintaining the support, friction devices and bushing in cooperative relation.

14. The combination of a driving element provided with a clutch chamber, and a driven element, of clutch mechanism mounted on the driven element within said chamber and comprising a support having a plurality of alternating depressions in the sides thereof, a plurality of friction devices peripherally disposed about the support and engaged therewith, a toggle collar movable longitudinally of the driven element and having ears projecting into one set of said depressions, and levers operatively disposed in said depressions and pivotally mounted at one end on said ears and pivotally connected at the other end to said friction devices.

15. The combination of a driving element provided with a clutch chamber, and a driven element, of clutch mechanism mounted on the driven element within said chamber and comprising a support, adjusting rings cooperatively engaged and spaced apart, a plurality of friction devices pivotally mounted in said rings and engaged with said support, and means for moving said friction devices radially of the support into or out of operative engagement with the driving element.

GUSTAVE C. NELSON.

Witnesses:
Wm. O. Belt,
M. A. Kiddie.